United States Patent
Ashour

(10) Patent No.: US 12,545,587 B2
(45) Date of Patent: Feb. 10, 2026

(54) RECYCLED GRAPHITE SURFACE REPAIR AND CONDUCTIVE CARBON SEPARATION

(71) Applicants: Mexichem Fluor, Inc., San Gabriel, LA (US); Ascend Elements, Inc., Westborough, MA (US)

(72) Inventor: Rakan Ashour, San Gabriel, LA (US)

(73) Assignees: Mexichem Fluor, Inc., San Gabriel, LA (US); Ascend Elements, Inc., Westborough, MA (US)

( * ) Notice: Subject to any disclaimer, the term of this patent is extended or adjusted under 35 U.S.C. 154(b) by 32 days.

(21) Appl. No.: 18/771,485

(22) Filed: Jul. 12, 2024

(65) Prior Publication Data
US 2025/0026646 A1    Jan. 23, 2025

Related U.S. Application Data

(60) Provisional application No. 63/527,471, filed on Jul. 18, 2023.

(51) Int. Cl.
*H01M 10/54*    (2006.01)
*C01B 32/21*    (2017.01)
*H01M 4/1393*    (2010.01)
*H01M 4/36*    (2006.01)
*H01M 4/587*    (2010.01)
*H01M 4/02*    (2006.01)

(52) U.S. Cl.
CPC ........... *C01B 32/21* (2017.08); *H01M 4/1393* (2013.01); *H01M 4/366* (2013.01); *H01M 4/587* (2013.01); H01M 2004/021 (2013.01)

(58) Field of Classification Search
None
See application file for complete search history.

(56) References Cited

U.S. PATENT DOCUMENTS

| | | | | |
|---|---|---|---|---|
| 2021/0384563 A1* | 12/2021 | Gratz | .................... | H01M 4/131 |
| 2022/0259047 A1* | 8/2022 | Frey | ...................... | C01B 32/215 |
| 2023/0299290 A1* | 9/2023 | Yoo | ........................ | H01M 4/587 |
| | | | | 429/231.8 |
| 2024/0194961 A1* | 6/2024 | Singh | ..................... | C22B 47/00 |

FOREIGN PATENT DOCUMENTS

EP    4570934    *    6/2025

* cited by examiner

*Primary Examiner* — Austin Murata
(74) *Attorney, Agent, or Firm* — Joseph T. Leone; Yanjun Ma; DeWitt LLP

(57) ABSTRACT

A process to make battery-grade graphite from black mass. The process entails spheronizing graphite derived from black mass to yield spheronized graphite, classifying the spheronized graphite to remove conductive carbon fines, and optionally coating the resulting bulk graphite to reduce its specific surface area.

17 Claims, 3 Drawing Sheets

RECYCLED GRAPHITE SURFACE REPAIR AND CONDUCTIVE CARBON SEPARATION

CROSS-REFERENCE TO RELATED APPLICATIONS

Priority is hereby claimed to U.S. provisional application Ser. No. 63/527,471, filed Jul. 18, 2023, which is incorporated herein by reference.

BACKGROUND

Recycling lithium-ion batteries is crucial for creating a "circular economy" (or a more close-to-circular economy) in the burgeoning field of plug-in electric vehicles. See, for example, Mousa et al. (2023) "Characterization and Thermal Treatment of the Black Mass from Spent Lithium-Ion Batteries," *Sustainability* 15(1), 15; doi.org/10.3390/su15010015. Conventionally, spent lithium-ion batteries ("LIBS") are first handled by "pre-processors." Pre-processors are for-profit companies that collect spent LIBS and perform the initial deconstruction of the LIBS. Typically, the pre-processors separate materials such as binder, copper, electrolytes, plastics, aluminum, and/or steel from the shredded batteries. What remains (and accounts for roughly 40 to 50 wt % of the total weight of the battery) is referred to as "black mass." Black mass comprises the most value-added components of a LIB: lithium, manganese, cobalt, nickel, and/or copper, and graphite (which give the mixture its black color). The ingredients found in black mass and their concentrations vary widely simply because there are many different types of LIBS. Lithium (in one form or another) and graphite, however, are always present in black mass. The resulting black mass is typically then sold to other processors who take on the task of separating the black mass into its component metallic ingredients (typically in the form of salts and/or metal hydroxides). In short, black mass is a rich source of active materials to be reclaimed for use in new batteries or other applications.

Because the plug-in electric vehicle (EV) market is expected to grow with increasing speed in the coming years, there has been intense interest in processing black mass efficiently and cheaply. See, for example, H. S. Ahn, U.S. Published Patent Application US 2023/0178722, published Jun. 8, 2023. This published application describes an essentially explosive method for separating cathode and anode material from black mass. The black mass is pyrolytically heated to a temperature wherein lithium present in the black mass undergoes an explosive reaction. At the same time, any binder, electrolyte, and separator material in the black mass are gasified into syngas (driven in part by the extremely exothermic explosive reaction of the lithium). The resulting syngas is removed from the reactor. The resulting mixture contains only the graphite and the metals originally present in the black mass.

See also Belharouak et al., U.S. Pat. No. 11,664,542, issued May 30, 2023. The method includes isolating a composite electrode comprising an electrode material adhered to a current collector with a polyvinylidene difluoride (PVDF) binder. The composite electrode is combined with triethyl phosphate (TEP) as a solvent to form a mixture. The electrode material is delaminated from the current collector in the mixture to give a free electrode material and a free current collector. Each of the free electrode material and the free current collector is recovered from the mixture. The free electrode material may be reused to prepare another composite electrode.

Bobbili et al., U.S. Published Patent Application US 2023/0175099, published Jun. 8, 2023, describes a method in which ground batteries are pyrolyzed at a temperature between about 100° C. and 700° C. for a time sufficient to vaporize about 80 wt % to 100 wt % of electrolytes present in the ground battery material. The resulting material is further ground and screen classified to produce a screen oversize and a screen undersize. The screen oversize comprises metals and plastics, while the screen undersize comprises a black mass material. Lithium dissolution, triboelectric charging, and electrostatic separation of the black mass material (not necessarily in that order) produces a liquid comprising dissolved lithium, a graphite product, and a concentrated metal fines product. Lithium is then precipitated from the liquid component. The concentrated metal fines may optionally be further treated by hydrometallurgy or pyrometallurgy processes to remove unwanted contaminants.

There remains a long-felt and unmet need to derive value-added materials from black mass derived from recycled lithium-ion batteries. The present disclosure describes a method for fractionating black mass and recovering specific materials from the black mass.

SUMMARY

Disclosed herein is a method to repair the surface area, tapped density, sphericity and control the particle size distribution of graphite recovered from a black mass of lithium-Ion batteries. Recycled graphite typically has sub-standard tap density (0.6-0.8 g/cm$^3$) and non-ideal flakey surface revealed by SEM images. Moreover, recycled graphite can include an unknown mixture of natural and synthetic graphite with different particle morphology. To repair the graphite surface, control the particle size distribution, and produce uniform particle morphology, the recycled particles are re-spheronized. This is preferably done by subjecting the particles to mechanical forces that fold the graphite layers into tightly packed spherical particles. In addition to repairing the surface structure, the recycled graphite typically has a wide particle side distribution. This is due to the presence of conductive additives that are used in the formulation of electrode materials and the possible presence of finely fractured graphite particles. To restore the required narrow particle size distribution, the recycled graphite particles are micronized and classified based on their tapped density or particle size. This allows for the separation of conductive carbon and fine additives that can be sold as a separate product.

Thus, disclosed and claimed herein is a process to make battery-grade graphite anode active material from black mass, the method comprising:
(a) spheronizing graphite derived from black mass to yield spheronized graphite; and
(b) classifying the spheronized graphite from step (a) to remove the fines, thereby yielding battery-grade.

The process may further comprise (c) coating the graphite with amorphous carbon to yield coated graphite. The graphite can be coated with amorphous carbon in a weight percentage of from about 0.5 to about 15 wt %, wherein the amorphous carbon comprises petroleum pitch, coal tar pitch, or mixtures thereof.

The resulting graphite has a specific surface area less than or equal to about 10 m$^2$/g, a tap density from about 0.5 g/cm$^3$ to about 1.5 g/cm$^3$, and a particle size distribution having D50 of less than 25 μm, and D90 less than 60 μm. In certain versions, the resulting graphite has a particle size distribution span value D90/D10 less than 5.

More specifically, disclosed herein are the following:
1. A process to make battery-grade graphite anode active material from black mass, the method comprising:
   (a) spheronizing graphite derived from black mass to yield spheronized graphite; and
   (b) classifying the spheronized graphite from (a) to remove fines having a D50<about 8 μm, thereby yielding battery-grade graphite anode active material.
2. The method of claim 1, further comprising:
   (c) coating the battery-grade graphite anode active material with amorphous carbon to yield coated graphite.
3. The method of claim 2, wherein in step (c) the battery-grade graphite anode active material is coated with amorphous carbon in a weight percentage of from about 0.5 to about 15 wt %.
4. The method of claim 2, wherein in step (c) the amorphous carbon comprises petroleum pitch, coal tar pitch, or mixtures thereof.
5. The method of any preceding claim, wherein the resulting battery-grade graphite anode active material has a specific surface area less than or equal to about 10 m$^2$/g.
6. The method of any preceding claim, wherein the resulting battery-grade graphite anode active material has a tap density from about 0.5 g/cm$^3$ to about 1.5 g/cm$^3$.
7. The method of any preceding claim, wherein the resulting battery-grade graphite anode active material has a particle size distribution having a D50 of less than about 25 μm and greater than about 8 μm, and a D90 less than about 60 μm.
8. The method of any preceding claim, wherein the resulting battery-grade graphite anode active material has a particle size distribution span value D90/D10 less than about 5.

The objects and advantages of the disclosure will appear more fully from the following detailed description of the preferred embodiment of the disclosure made in conjunction with the accompanying drawings.

DETAILED DESCRIPTION

Abbreviations and Definitions

Figure 1:
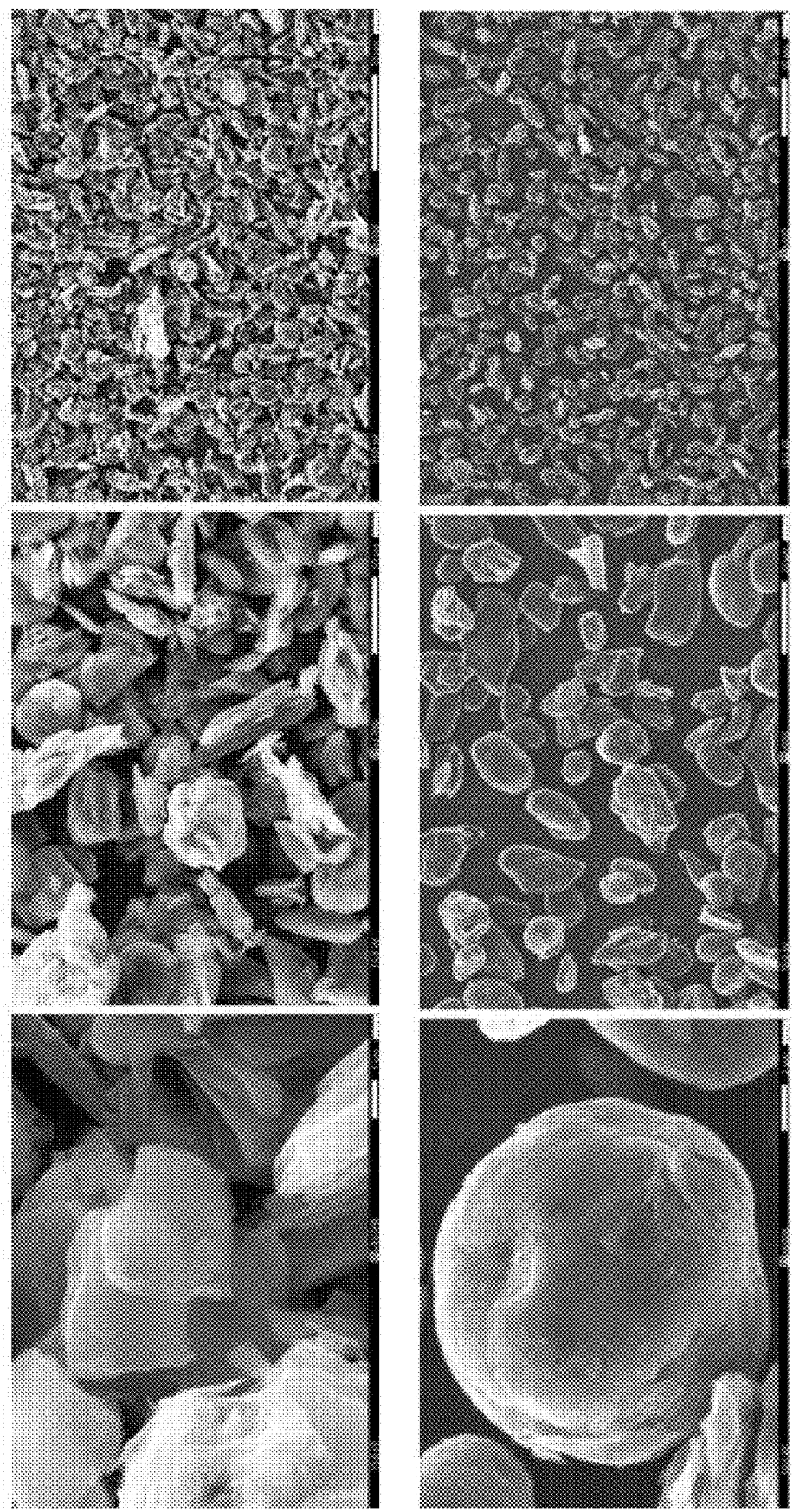
FIG. 1 is a series of photographs depicting recycled purified graphite before re-spheronization (top photos) and after re-spheronization (bottom photos). From left-to-right in the top series of photos, the scanning electron microscopy ("SEM") images are at 1 μm, 10 μm, and 50 μm resolution. The bottom series, from left-to-right, are at 2 μm, 20 μm, and 50 μm resolution. The top series of photos show that graphite reclaimed from spent batteries comprises a large percentage of flake-like particles. The bottom series of photos shows the same sample of recycled graphite after re-spheronization as described herein.

"Black mass" refers to the mixture that results when a spent battery is shredded after the end of its useful life. When the battery shredded is a lithium-ion battery, the resulting black mass principally comprises lithium, manganese, cobalt, nickel, and/or copper, and graphite. The graphite, which gives black mass its distinctive black color is due to the high concentrations of graphite contained in the anodes of batteries. Conventionally, black mass is processed by different methods including: (1) Incineration (in the presence of oxygen) or pyrometallurgy (thermal treatment in the absence of oxygen). The shredded battery contents are either incinerated or pyrolyzed at high temperatures to burn off unwanted materials such as plastics and residual electrolyte. (2) Hydrometallurgy/leaching. The shredded battery contents are treated in solution to separate other battery components from the desired metals and graphite. The manner by which the black mass is generated or processed is irrelevant to the method disclosed herein. Black mass produced by any means can be used as a feedstock in the current method.

"LIB"=lithium-ion battery.

Particle size and particle size distribution: Particle size and particle size distribution in a bulk particulate material can be measured using several conventional techniques (e.g., sieving, laser diffraction, dynamic light scattering, image analysis, etc.) which will not be discussed in any detail herein. See, for example, Clive Washington, Ph.D. "Particle Size Analysis in Pharmaceutics and Other Industries: Theory and Practice," ©2007, Ellis Horwood Ltd, West Sussex, England, ISBN 978-0136516132. Particle size distribution can conventionally be characterized by standard deviation, variance, and coefficient of variation. Another conventional approach is to define the particle size distribution by a diameter value at which a certain percentage of the particles are equal to or smaller than. That is, the "D50" value is the median of the particle size distribution. D50 is the diameter where half of the particles have a diameter equal to or smaller than the D50 value. Similarly, 90 percent of the particles have a diameter equal to or smaller than the "D90" value; 10 percent of the particles have a diameter equal to or smaller than the "D10" value, etc. The D10, D50, and D90 values are used to calculate the "span value," which is another way to characterize the width of the particle size distribution. Span value=D90/D10.

"SEM"=scanning electron microscopy.

Specific surface area is defined as the total surface area of a material per unit of mass, typically rendered in units of m$^2$/kg or m$^2$/g.

"Spheronization" (synonyms include "marumerization," "pelletization," and "micropelletization") is a process wherein a material is shaped into small, rounded, roughly spherical granules.

"Tapped density" or "Tap density" is the density of a particulate or powdered material in which a weighed sample of the material is placed in a graduated cylinder, which is then tapped until no further volume change is observed. The final volume is then recorded. The tapped density is the mass of the sample divided by the tapped volume it occupies. Tapped density includes the inter-particulate void volume, i.e., powder mass (g)/bulk volume after tapping, including inter-particulate void volume (mL).

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All references to singular characteristics or limitations of the disclosed method shall include the corresponding plural characteristic or limitation, and vice-versa, unless otherwise specified or clearly implied to the contrary by the context in which the reference is made. The indefinite articles "a" and "an" mean "one or more."

As used herein, the term "or" is an inclusive "or" operator and is equivalent to the term "and/or" unless the context clearly dictates otherwise.

As used herein, the term "about" refers to ±10% of the variable referenced.

The elements and method steps described herein can be used in any combination whether explicitly described or not, unless otherwise specified or clearly implied to the contrary by the context in which the referenced combination is made.

All combinations of method steps disclosed herein can be performed in any order, unless otherwise specified or clearly implied to the contrary by the context in which the referenced combination is made.

The method disclosed herein can comprise, consist of, or consist essentially of the essential elements and steps described herein, as well as any additional or optional ingredients, components, or limitations described herein or otherwise useful in organic chemistry. The disclosure provided herein suitably may be practiced in the absence of any element which is not specifically disclosed herein.

The Process to Upcycle Graphite from Waste Lithium-ion Batteries

Disclosed herein is a process to upcycle graphite recovered from spent, discarded, field returned, and scrapped lithium-ion batteries. The process yields high-purity, high-value graphite whose performance and properties are similar if not identical to virgin graphite materials.

The anode material in lithium-ion batteries must satisfy strict material and performance requirements to be used as active material in high-end applications. The graphite produced according to the present process fulfills these performance requirements. Notably, graphite produced according to the process typically has a purity >99.95%, a tapped density from about 0.9 to about 1 g/cm$^3$, a narrow particle size distribution (D90/D10~2.5) and a low specific surface area (depending on the feedstock, typically <5 m$^2$/g).

During battery cycling, the graphite volume in the anode expands to allow for lithium to intercalate between the graphene layers. Therefore, with repeated cycling, the graphite undergoes mechanical stresses that ultimately lead to damage to its structure. This damage typically manifests as partial exfoliation of outer layers of the anode, which leads to increased surface area and decreased tapped density of the graphite. Additional damage to the graphite occurs during the recycling process. Mechanical shredding crushes and fractures the graphite, causing the particles to lose their original spherical shape. Further still, the use of oxidizing agents such as $H_2O_2$ during black mass processing also leads to partial exfoliation of the graphite.

Disclosed herein is a process wherein graphite recovered from spent lithium-ion batteries is purified to battery grade (>99.95). After purification, the recycled graphite has an unacceptable tapped density (too small) and a non-ideal particle size distribution and surface shape as revealed by SEM images. (See FIG. 1.) To repair the surface and shape of the graphite particles, the particles are re-spheronized to increase the tapped density of the material (from about 0.6 g/cm$^3$ to about 0.9 g/cm$^3$ or higher).

Figure 2:
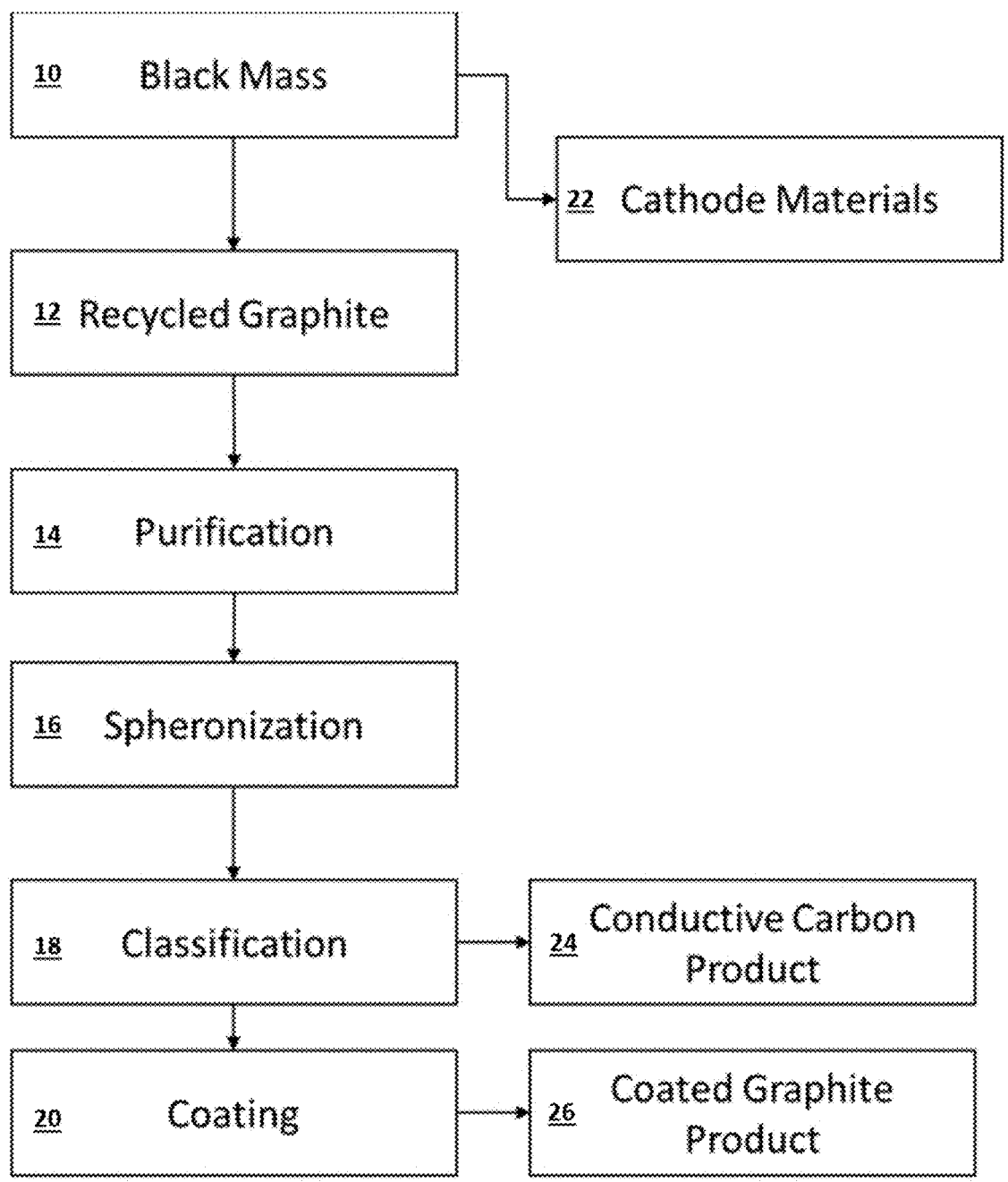
FIG. 2 is an exemplary process flow diagram for making surface-repaired recycled graphite from black mass using the process disclosed and claimed herein.

The complete process from black mass is shown schematically in FIG. 2. The black mass 10 is first treated to remove the metallic cathode materials 22. The resulting raw recycled graphite 12 is then purified at 14 to remove at least a portion of any remaining impurities. The purified graphite is then spheronized 16 and classified 18. Classification separates the fines, which may be sold as conductive carbon 24. The remaining, spheronized bulk material whose D50 particle size is larger than the fines is coated at 20 to yield the final battery-grade bulk graphite material 26.

Spheronization is preferably accomplished by subjecting the particles to mechanical shear forces, a non-limiting example being impact milling. Impact mills suitable for this purpose are available commercially from a host of suppliers, including Netzsch Premier Technologies, LLC, Exton, Pennsylvania, USA and Hosokawa Alpine Group, Osaka, Japan. Friction plate spheronizers may also be used. These machines are also available from a host of commercial suppliers, including AC Compacting Equipment LLC, North Brunswick, New Jersey, USA. The method by which the spheronization is accomplished is not critical, so long as the particles are adequately spheronized. Thus, any method of spheronization, now known or developed in the future, may be used. Moreover, spheronization may include a micronization or pulverization step that changes the mean particle size.

The spheronized graphite is then passed through a classification system. This separates the particles based on density or particle size and removes the fines (including conductive carbon). This can be accomplished using conventional, commercial equipment such as air classifiers, zig-zag classifiers, rotary sieves, and the like. (Such equipment is available from many international suppliers, including Hosokawa Micron Powder Systems, Summit, New Jersey, USA, Prater Industries, Inc., Bolingbrook, Illinois, USA, and Vortec Products Company, Long Beach, California, USA.) The classified graphite has a higher tapped density and far more spherical particle morphology as compared to the unprocessed, raw graphite. Compare the top three photos in FIG. 1 to the bottom three photos. The separated fines are also value-added and are salable separately as conductive carbon.

EXAMPLES

Preparing battery-grade graphite from recycled material presents different problems than when starting from virgin graphite. The feedstock (black mass from recycled batteries) is a powder mixture that typically contains cathode material, anode material, binder, residual separator material, and/or residual electrolyte material. The metallic materials (lithium, nickel, cobalt, etc.) are separated, yielding a low-purity graphite. The graphite is then purified to battery-grade (>99.95% pure) using various methods, including caustic baking followed by acid leaching. This yields a graphite of the required purity. But the particle shape of the graphite produced in this manner is unsuitable for use in a battery anode.

The surface repair process described herein uses the recycled graphite as the input feedstock. The graphite is subjected to mechanical shaping/spheronization to remove at least a portion of damaged outer layers to yield a spheronized graphite. The mechanical shaping also compacts the graphite such that the spheronized bulk graphite has a significantly higher tapped density as compared to the incoming, untreated graphite. See Table 1. The order in which the spheronizing, purifying and classifying is performed is not fixed and can be changed depending on the target product specifications and the properties of the input recycled graphite.

In one example, recycled graphite was recovered from black mass of production scrap. The graphite was re-spheronized in a batch process using an air classifier mill and then classified based on particle size and tap density. As can be seen from Table 1, the fines have a tapped density much lower than the spheronized bulk material, which has a larger D50 particle size (i.e., a larger mean particle size).

TABLE 1

Summary of particle-size-based classification of re-spheronized recycled graphite. 99.98% of particles are accounted for. Less than 10% is considered fines.

| Particle Size (D50) μm | Specific Area ($m^2/g$) | Tap Density ($g/cm^3$) | Yield % | Class |
|---|---|---|---|---|
| 14.65 | 4.67 | 1.1 | 9.61 | Graphite |
| 13.99 | 4.65 | 1.04 | 24.55 | Graphite |
| 11.91 | 4.56 | 0.98 | 27.37 | Graphite |
| 10.08 | 5.69 | 0.96 | 20.02 | Graphite |
| 8.51 | 5.7 | 0.88 | 8.64 | Graphite |
| 7.93 | 6.02 | 0.82 | 0.74 | Fines |
| 7.21 | 6.08 | 0.80 | 0.78 | Fines |
| 6.0 | 8.10 | 0.66 | 8.27 | Fines |

The smallest particles shown in Table 1 (D50<about 8 μm) are considered fines. Some of these fines are present in the incoming feedstock graphite (conductive carbon). The remaining fines result from the re-spheronization of the graphite particles. The conductive carbon is a value-added material which is separated/classified from the larger particles and can be sold on the open market.

After separating the fines, the graphite is coated by a material that reduces the specific surface area of the bulk material. Such coatings include but are not limited to petroleum or coal-tar pitch carbon-based coatings.

The coating process comprises mixing the recycled graphite with micronized petroleum or coal-tar pitch. For example, mixing is done via dry mixing at temperatures <about 300° C. or by using suitable a solvent. The coating process further comprises a sintering step at elevated temperature <about 2000° C. under inert atmosphere.

A exemplary comparison of the graphite properties at each step of the process is shown in Table 2.

TABLE 2

Comparison of recycled graphite properties before spheronization, after spheronization, and after carbon coating.

| | Before Spheronization | After Spheronization | After Spheronization and Coating |
|---|---|---|---|
| Tapped Density ($g/cm^3$) | 0.67 | >0.9 (average) | 1.05 |
| Specific Surface Area ($m^2/g$) | 4.71 | 4.67 | 1.3 |

Figure 3:
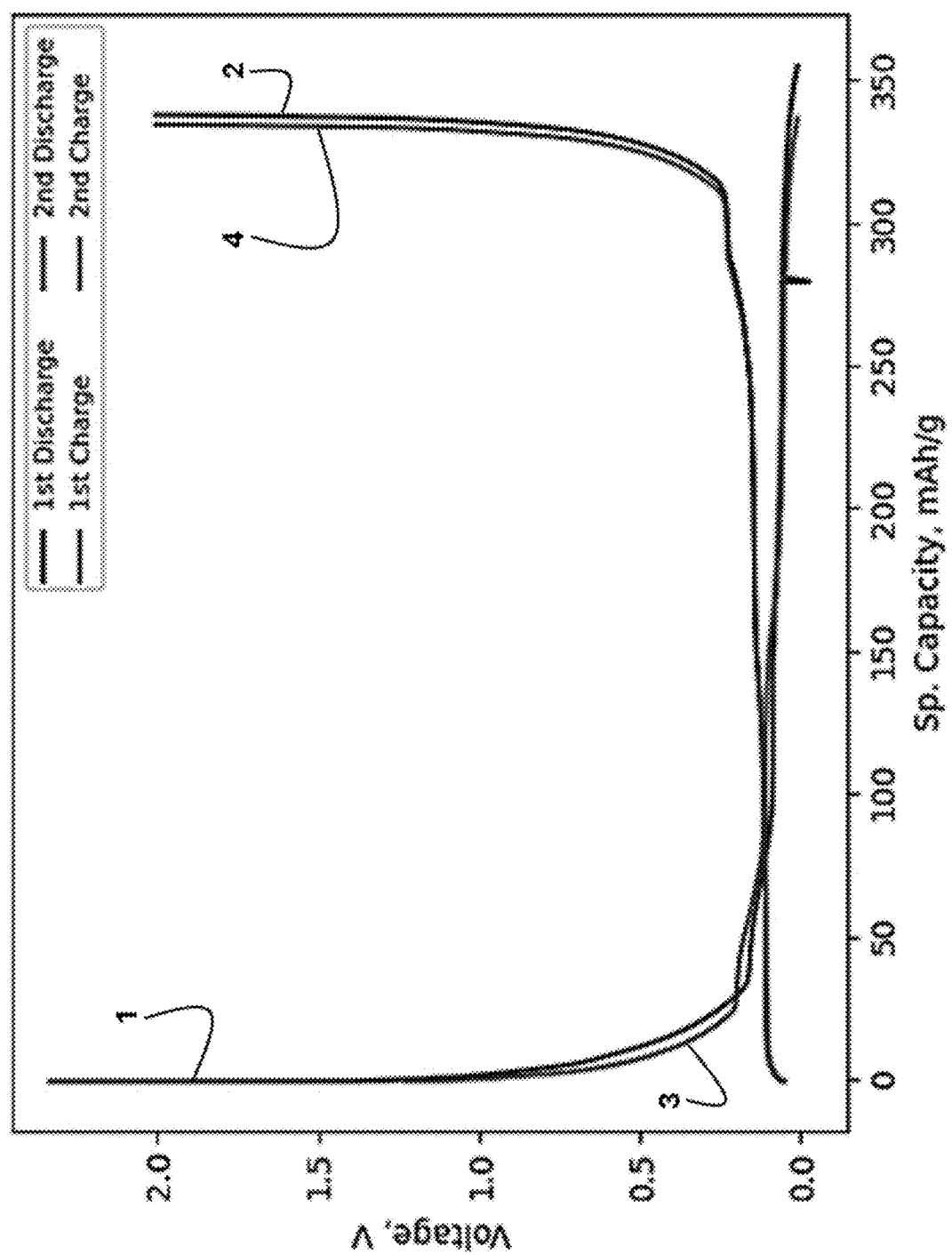
FIG. 3 is a graph depicting electrochemical testing of recycled graphite after re-spheronization and carbon coating. The initial coulombic efficiency is 95.2% and the reversable capacity is 337 mAh/g. First discharge is trace 1; first charge is trace 2. Second discharge is trace 3; second charge is trace 4.

To test the electrochemical performance of the re-spheronized and coated graphite, a half-cell was constructed using the recycled graphite for one electrode; lithium metal was used for the reference and counter electrodes. The recycled graphite showed excellent initial coulombic efficiency of 95% and a reversable capacity of >330 mAh/g. See FIG. 3, wherein the first discharge is trace 1 and the first charge is trace 2. The second discharge is trace 3 and the second charge is trace 4.

In another example, recycled graphite recovered from black mass was re-spheronized in a batch process using an air classifier mill. The recycled graphite feed had a tap density of 0.7 $g/cm^3$ and a specific area of 2.31 $m^2/g$. After 8 minutes in the batch air classifier mill, the graphite tap density increased to 0.92 $g/cm^3$ and the specific area also increased to 2.84 $m^2/g$. The fact that the specific area of this graphite remained under 3 $m^2/g$ suggests pitch coating was retained during the recycling process. Multiple batches of this graphite were spheronized with an average yield of 79%.

An interesting observation is that the spheronization and classification process results in the reduction of volatile content. In the same example, the volatile content was measured via mass loss at 400° C. under oxygen. A decrease in volatile content from 3.3% in the feed to 2.4% was recorded. Moreover, the purity of the graphite (measured via mass loss at 950° C. under oxygen) material improved from 98.17% in the feed material to 99.14% in the spheronized sample. It is possible that fine impurity particles, binders, and other volatiles are removed during the classification process.

In another example, graphite recovered from end-of-life recycled battery cells was purified to >99.95%. The graphite feed had a flake-like morphology with low tap density (<0.7 $g/cm^3$). This can be attributed to structural changes incurred during repeated cycling. To repair the graphite morphology, the particles were spheronized in a batch process using an air classifier mill and then classified based on particle size and tap density. After spheronization and classification, the particles were coated with petroleum pitch in the amount of 7% by weight. The final product had a particle size distribution D50 of 19.18 μm, a tap density of 1.03 $g/cm^3$, and a specific area of 3.1 $m^2/g$. To test the electrochemical performance of this graphite, a half-cell was constructed using the recycled graphite for one electrode; lithium metal was used for the reference and counter electrodes. The recycled graphite showed excellent initial coulombic efficiency >94% and reversible capacity of 350 mAh/g.

What is claimed is:

1. A process to make battery-grade graphite anode active material from black mass, the method comprising:
    (a) providing black mass from recycled lithium-ion batteries, the black mass comprising graphite, at least a part of which is damaged anode material
    (b) spheronizing at least a portion of the graphite contained in the black mass of step (a) to yield spheronized graphite; and
    (c) classifying the spheronized graphite from (b) to remove fines having a D50<about 8 μm, thereby yielding battery-grade graphite anode active material.

2. The method of claim 1, further comprising:
    (d) coating the battery-grade graphite anode active material with amorphous carbon to yield coated graphite.

3. The method of claim 2, wherein in step (d) the battery-grade graphite anode active material is coated with amorphous carbon in a weight percentage of from about 0.5 to about 15 wt %.

4. The method of claim 2, wherein in step (d) the amorphous carbon comprises petroleum pitch, coal tar pitch, or mixtures thereof.

5. The method of claim 1, wherein the battery-grade graphite anode active material has a specific surface area less than or equal to about 10 $m^2/g$.

6. The method of claim 1, wherein the battery-grade graphite anode active material has a tap density from about 0.5 $g/cm^3$ to about 1.5 $g/cm^3$.

7. The method of claim 1, wherein the battery-grade graphite anode active material has a particle size distribution having a D50 of less than about 25 μm and greater than about 8 μm, and a D90 less than about 60 μm.

8. The method of claim 1, wherein the battery-grade graphite anode active material has a particle size distribution span value D90/D10 less than about 5.

9. The method of claim 2, wherein the battery-grade graphite anode active material of step (c) has a specific surface area less than or equal to about 10 $m^2/g$.

10. The method of claim 2, wherein the battery-grade graphite anode active material of step (c) has a tap density from about 0.5 $g/cm^3$ to about 1.5 $g/cm^3$.

11. The method of claim 2, wherein the battery-grade graphite anode active material of step (c) has a particle size distribution having a D50 of less than about 25 μm and greater than about 8 μm, and a D90 less than about 60 μm.

12. The method of claim 2, wherein the battery-grade graphite anode active material of step (c) has a particle size distribution span value D90/D10 less than about 5.

13. A process to make battery-grade graphite anode active material from black mass, the method comprising:
 (a) providing black mass from recycled lithium-ion batteries, the black mass comprising graphite, at least a part of which is damaged anode material
 (b) spheronizing at least a portion of the graphite contained in the black mass of step (a) to yield spheronized graphite; and
 (c) classifying the spheronized graphite from (b) to remove fines having a D50<about 8 μm, thereby yielding battery-grade graphite anode active material; and
 (d) coating the battery-grade graphite anode active material with amorphous carbon comprising petroleum pitch, coal tar pitch, or mixtures thereof, in a weight percentage of from about 0.5 to about 15 wt % to yield coated graphite.

14. The method of claim 13, wherein the battery-grade graphite anode active material of step (c) has a specific surface area less than or equal to about 10 $m^2/g$.

15. The method of claim 13, wherein the battery-grade graphite anode active material of step (c) has a tap density from about 0.5 $g/cm^3$ to about 1.5 $g/cm^3$.

16. The method of claim 13, wherein the battery-grade graphite anode active material of step (c) has a particle size distribution having a D50 of less than about 25 μm and greater than about 8 μm, and a D90 less than about 60 μm.

17. The method of claim 13, wherein the battery-grade graphite anode active material of step (c) has a particle size distribution span value D90/D10 less than about 5.

* * * * *